UNITED STATES PATENT OFFICE.

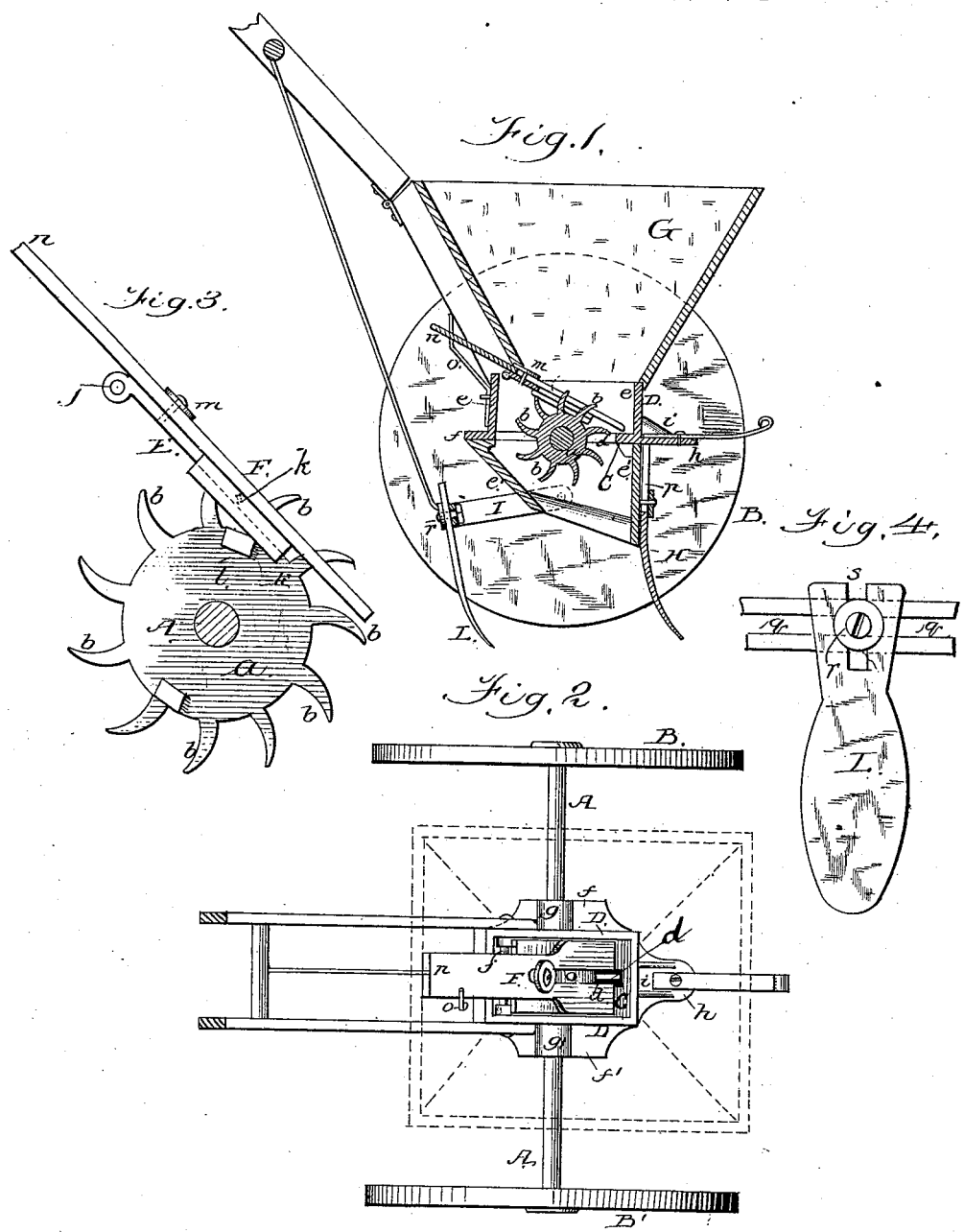

BENJAMIN P. MORGAN, OF GREENVILLE, SOUTH CAROLINA.

COTTON-PLANTER AND GUANO-DISTRIBUTER COMBINED.

SPECIFICATION forming part of Letters Patent No. 256,027, dated April 4, 1882.

Application filed November 17, 1881. (No model.)

*To all whom it may concern:*

Be it known that I, BENJAMIN P. MORGAN, of Greenville, in the county of Greenville and State of South Carolina, have invented a new and Improved Combined Cotton-Planter and Guano-Distributer; and I hereby declare the following to be a full, clear, and exact description thereof, reference being had to the accompanying drawings, making part of this specification, in which—

Figure 1 is a perspective view of the combined machine. Fig. 2 is a plan view. Figs. 3 and 4 are details to be referred to.

The object of my invention is to provide a machine which will sow cotton-seed and distribute a fertilizer with the seed as it is sown.

My invention consists of certain combinations of devices, as will be hereinafter fully described and specifically claimed.

In order that those skilled in the art may make and use my invention, I will proceed to describe the manner in which I have carried it out.

In the said drawings, A is the supporting-axle and B B' the wheels, one being fixed to the axle and the other revolving loosely upon it. At the center of the axle is fixed a hub, $a$, from which projects a series of curved fingers, $b\ b$, which force the seed and fertilizer through a slot, $d$, in the throat-plate C, whence they drop through a contracted throat, $e$, to the ground.

The hub $a$ is surrounded by a box or housing, D, formed of two sections, $e\ e'$, provided with flanges $f\ f'$, which are bolted together, clasping the axle and forming journal-boxes $g\ g'$, in which the axle turns. The forward end of the housing is provided with a projecting flange, $h$, braced at $i\ i$, for the purpose of attaching the drawing-beam.

Near the rear of the upper edge of the housing D, by means of a bolt, $j$, is pivoted a swinging slotted distributing and agitating plate, E, having on its lower edges, adjacent to the housing, two ribs, $k\ k$, which lie below the ends of the hub $a$, and are thrown upward at each revolution of the hub by means of projections $l\ l$ from the ends of the hub.

Fastened on the upper face of the plate E by means of an adjusting-screw, $m$, is a slotted sliding plate, F, which forms an extension over plate, E, and moves with it. The proportion of the material agitated in the hopper G and the housing depends upon the degree to which plate F is thrust forward.

When it is desired to remove the material being sown from the operation of the fingers $b\ b$ the handle $n$ of plate F is pushed down and caught beneath spring $o$. This raises the plate and the load up out of reach of the feeding-fingers, as shown.

To the face of the metal housing is secured the furrow-opening plow H by means of a slot, $p$, and an adjusting or set screw, whereby the position of the point may be raised or lowered.

Projecting from the rear of the housing and pivoted to its sides is a flat iron yoke, I, having a slot, $q$, in its rear face, for receiving bolts $r\ r$, for securing the covering-plows L L. The shanks of plows L L are slotted vertically, as seen at $s\ s$, whereby with the aid of slot $q$ the said plows have both a vertical and horizontal adjustment.

Having thus described my invention, what I claim as new, and desire to secure by Letters Patent, is—

The agitator-plate E, in combination with the adjustable extensible slide-plate F, substantially as described.

B. P. MORGAN.

In presence of—
G. G. WELLS,
GEO. WESTMORELAND.